July 26, 1955  M. J. SINGER ET AL  2,714,037
BURIED SPRINKLER SYSTEM

Filed Feb. 28, 1955  4 Sheets-Sheet 1

INVENTOR
MONROE J. SINGER
GEORGE G. SINGER
BY Jarvis C. Marble
ATTORNEY

2,714,037
BURIED SPRINKLER SYSTEM

Monroe J. Singer and George G. Singer,
Garden City, N. Y.

Application February 28, 1955, Serial No. 491,024

28 Claims. (Cl. 299—60)

This invention relates to soil treatment and more particularly to a sprinkler system which may be completely prefabricated and marketed as a unit and may be installed as a buried system by the homeowner with a minimum of earth removal or labor.

Buried sprinkler systems have been utilized for many years, but the majority of these systems require the installation of permanent piping, with the consequent necessity for providing a trench of sufficient size to permit working therein in making up the pipe joints and furthermore, these prior systems were not available in pre-fabricated units which could be conveniently installed by the homeowner. As is well known, the spray heads or nozzles are commonly installed substantially at ground level and it is sometimes necessary to remove such spray heads or nozzles in order to repair or replace the same. In prior systems these nozzles were attached to the upper ends of stand-pipes, which in turn were attached to a buried conduit and frequently in removing the spray heads, the standpipes were loosened in the conduit, thus breaking the joint and permitting water leakage. This often necessitated excavating the conduit in order to repair the damage thereto.

As is well known, the coverage afforded by the spray heads of a buried sprinkler system is dependent to a great extent upon the water pressure available and frequently, when such water pressure varies, the area of coverage likewise varies. In most prior art systems no means has been provided to adjust the coverage afforded by the spray heads in order to compensate for changes in water pressure.

Also in prior art installations where a flexible conduit or hose was utilized, such conduit has commonly been of round cross section and consequently, the volume of water carried by the same has been reduced and considerable difficulty has been experienced in conveniently attaching the standpipe to the conduit.

It is accordingly an object of the invention to provide a pre-fabricated sprinkler system which may be conveniently buried in the earth with a minimum of excavating and in which any number of spray heads located at any desired points along a conduit may be supplied.

A further object of the invention is the provision of a sprinkler system utilizing a flexible conduit of substantially square cross section and in which standpipes are connected thereto at spaced intervals, the connection affording a water-tight joint and also providing a locking means for preventing rotation of the stand-pipes relative to the conduit.

A still further object of the invention is the provision of a sprinkler system utilizing a flexible conduit of substantially square cross section and in which stand-pipes carrying spray heads may be attached to such conduit at any desired location.

Another object of the invention is the provision of a sprinkler system in which stand-pipes are attached to a flexible conduit of substantially square cross section by means of nipples inserted through said conduit and providing means to prevent rotation of such nipples with relation to the conduit.

A further object of the invention is the provision of a sprinkler system in which stand-pipes carrying spray heads are connected to a flexible conduit of substantially square cross section and in which means is provided to prevent displacement of such stand-pipes about the longitudinal axis of the conduit thereby insuring that all stand-pipes extend from the same side of the conduit.

A still further object of the invention is the provision of a sprinkler system utilizing a flexible conduit of substantially square cross section and in which stand-pipes are connected to such conduit and spray heads carried by the stand-pipes may be conveniently removed or replaced without removing the system from the earth, or without danger of breaking the water-tight joint between the stand-pipes and the conduit.

Another object of the invention is the provision of a sprinkler system to be buried in the earth and incorporating novel spray heads which may be adjusted to provide substantially the same area of coverage regardless of wide variations in water pressure.

A still further object of the invention is the provision of a sprinkler system to be buried in the earth and incorporating novel spray heads which may be conveniently disassembled for cleaning without removing any part of the system from the earth.

Another object of the invention is the provision of a sprinkler system to be buried in the earth and including a novel inlet or spray fitting which conveniently permits attachment of the system to a sill cock on a building by means of a short length of hose or other conduit.

A further object of the invention is the provision of a cross fitting for use in a buried sprinkler system, which fitting permits the attachment of additional conduits to provide greater spray coverage, such fitting also incorporating means to permit attachment of a stand-pipe carrying a spray head thereto, together with means for preventing relative rotation of such stand-pipe relative to the fitting.

A still further object of the invention is the provision of a sprinkler system to be buried in the earth and utilizing a flexible conduit to which stem pipes carrying spray heads are attached at suitable intervals and in which bearing means is provided for resisting depression of the spray heads below the surface of the earth by the application of a downward force above the surface of the earth.

Another object of the invention is the provision of a sprinkler system to be buried in the earth and utilizing a flexible conduit to which standpipes carrying spray heads are attached at suitable intervals and in which means is provided for resisting rotation of said conduit about its axis as the result of torque generated by a force applied laterally to the spray head or the upper ends of the standpipes from above the surface of the earth.

A further object of the invention is the provision of a sprinkler system to be buried in the earth and utilizing a flexible conduit of synthetic plastic having properties and of a character to resist damage or deterioration due to freezing or exposure to the elements and to the soil.

A still further object of the invention is the provision of a novel method of assembling a nipple and stand-pipe with a plastic conduit of substantially square cross section, at any desired location in such conduit and without necessitating access to the interior thereof, such nipple and stand-pipe providing a water-tight joint with the wall of the conduit.

Further objects and advantages of the invention will be apparent from the following description taken in conjunction with the accompanying drawing wherein.

Figures 1, 2, 3:
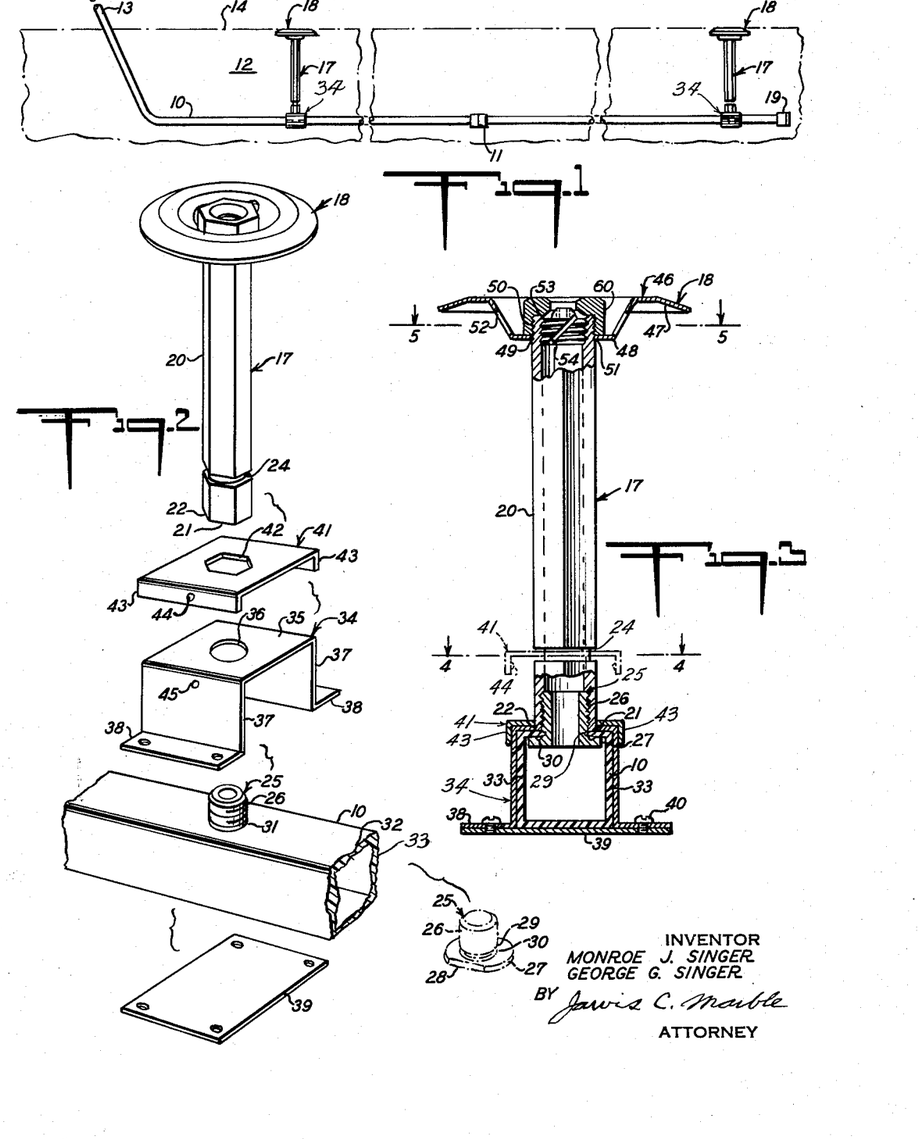
Fig. 1 is a view in side elevation showing a sprinkler system constructed in accordance with this invention and installed in operative position in the earth.
Fig. 2, an exploded perspective view showing the parts constituting a spray unit assembly and the relative position of such parts prior to assembly with the conduit.
Fig. 3, an elevational view with parts in section for greater clarity and showing a stand-pipe and spray head secured to a flexible conduit of substantially square cross section.

With continued reference to the drawing, there is shown a sprinkler system constructed in accordance with this invention and which may well comprise an elongated conduit 10 of substantially square cross section, which conduit may be conveniently formed of a suitable synthetic plastic or other flexible material having properties and of a character suitable for direct burial in the earth. As many sections of the conduit 10, as desired, may be utilized and such sections may be connected together by a suitable coupling 11. The conduit 10 is buried in the earth 12 by merely forming a narrow slot or trench and dropping the conduit therein, and such conduit may be provided with a section 13 extending above the surface 14 of the earth 12 and provided with a coupling 15 for attachment to the sillcock 16 of a dwelling or other building. The conduit 10 is provided with a plurality of stand-pipes 17 connected thereto at desired intervals, each stand-pipe carrying at its upper end a spray head 18 which is positioned at the surface 14 of the earth 12 and, of course, a sufficient number of spray heads 18 and stand-pipes 17 will be supplied to provide the desired spray coverage. The end of the conduit 10 may be closed by a suitable cap 19 and, of course, such cap may, if desired, be removed and additional sections of conduit 10 with stand-pipes 17 and spray heads 18 incorporated therein attached to afford a greater spray coverage.

Figure 12:
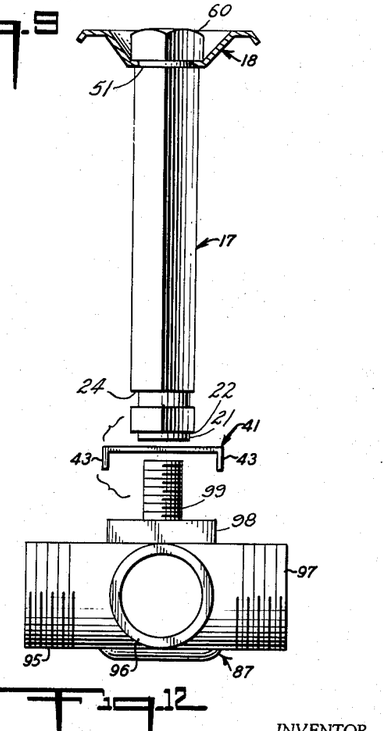
Fig. 12, an exploded elevational view showing the manner of attaching a stand-pipe and spray head to the cross fitting shown in Fig. 11.
Figure 13:
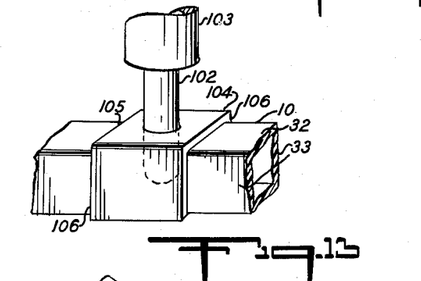
Fig. 13, a view in perspective showing the first step in assembling the system of this invention and particularly the manner of forming an aperture in the wall of the plastic conduit of square cross section.

As best shown in Figs. 2, 3 and 12 the stand-pipe 17 may well comprise an elongated tubular member of polygonal cross section, the stand-pipe 17 being shown for purposes of illustration, as being hexagonal. The main portion 20 of the stand-pipe 17 is of sufficient length to extend from the buried conduit 10 to the surface 14 of the earth 12 and the lower end of the pipe 20 may be provided with a reduced cylindrical portion 21 providing a shoulder 22. The pipe 20 is interiorly threaded at 23 and spaced from the end of the pipe 20, there is provided an annular groove 24 in the exterior surface thereof, the purpose of which will be presently described.

A nipple 25 is provided with a cylindrical threaded portion 26 and at one end of the nipple 25 there is provided an outwardly extending flange 27 having opposed flats 28 on the peripheral edge thereof. Between the flange 27 and the threaded portion 26 is an annular groove 29 and in the upper surface of the flange 27 there is provided an annular recess 30 having a diameter somewhat greater than the diameter of the reduced cylindrical portion 21 on the end of the pipe 20.

As shown in Figs. 1 and 2, the nipple 25 is applied to the conduit 10 with the threaded portion 26 extending through an aperture 31 in the wall 32 of the conduit 10 and the diameter of the aperture 31 is substantially equal to the diameter of the annular groove 29 in the nipple 25 and, as shown in Fig. 3, the wall of the conduit 10 surrounding the aperture 31 is positioned in the annular groove 29. The flange 27 is disposed within the conduit 10 and the flats 28 abut the opposed side walls 33 of the conduit 10 to prevent relative rotation between the nipple 25 and the conduit 10.

Positioned over the conduit 10 is a bracket 34 of substantially channel cross section and having a web 35 in which there is provided an aperture 36, there being spaced substantially parallel legs 37 extending from each end or edge of the web 35 and terminating in outwardly or laterally extending flanges 38. As shown in Fig. 3, the bracket 34 is positioned over the conduit 10 with the nipple 25 extending through the aperture 36 and with the legs 37 tightly embracing the side walls 33 of the conduit 10. In order to prevent spreading of the legs 37 of the bracket 34 there is provided a strap 39 bridging the same and secured to the flanges 38 by screw threaded or other suitable fastening means 40 extending through such flanges 38 and the strap 39. The bracket 34 constitutes a saddle engaging three sides of the conduit 10 with the strap 39 providing a base plate engaging the fourth side. This prevents relative rotation between the conduit and the bracket and the laterally extending flanges 38 embedded in the surrounding earth effectively resist rotation of the entire assembly about the longitudinal axis of the conduit.

The pipe 20 forming the standpipe 17 is threadedly received on the nipple 25, as shown in Fig. 3, and the reduced cylindrical portion 21 of the pipe 20 extends through the aperture 36 in the bracket 34 and the end face of the reduced portion 21 engages the upper wall 32 of the conduit 10 and forces the same into the annular recess 30 in the flange 27 of the nipple 25, thereby providing a fluid tight joint between the wall 32 of the conduit 10 and the nipple 25. The shoulder 22 on the pipe 20 engages the upper surface of the web 35 of the bracket 34 and securely clamps such bracket to the conduit 10.

In order to prevent relative rotation between the pipe 20 and the nipple 25, after the same has been installed, on the conduit 10, there is provided a locking plate 41 having a polygonal aperture 42 complementary to the surface of the pipe 20 and the plate 41 is slidably but non-rotatably received on the pipe 20 by means of the aperture 42. The locking plate 41 is provided with downwardly extending flanges 43 at each end thereof, and, as shown in Fig. 3, these flanges 43 embrace the legs 37 of the bracket 34 and prevent relative rotation between the pipe 20 and the nipple 25. If desired, the flanges 43 of the locking plate 41 may be provided with inwardly projecting dimples 44 which cooperate with recesses 45 in the legs 37 to releasably and frictionally hold the plate 41 in position on the bracket 34. When it is desired to remove the pipe 20, it is only necessary to detach the locking plate 41 from the bracket 34 and move the same upwardly to disengage the flanges 43 from the legs 37, whereupon the pipe 20 may be rotated and removed from the nipple 25.

When applying the pipe 20 to the nipple 25, it is recognized that the plate 41 would not always come to rest with the flanges 43 parallel to the legs 37 of the bracket 34 and consequently, the annular groove 24 is provided in the pipe 20, which permits positioning of the aperture 42 of the locking plate 41 in such groove 24 and rotation of the plate 41 relative to the pipe 20. In this manner, the plate 41 may be rotated to a position in which the flanges 43 are substantially parallel to the legs 37 of the bracket 34 whereupon the plate 41 may be slid downwardly on the pipe 20 to engage the flanges 43 with the legs 37 of the bracket 34. In this manner, the locking plate 41 may be properly aligned with the bracket 34 regardless of the relative position occupied by the polygonal surface of the pipe 20 and the legs 37 of the bracket 34. It is also to be noted, that during tightening of the pipe 20 on the nipple 25, that the legs 37 of the bracket 34 will prevent spreading of the walls 33 of the conduit 10, by reason of the tendency of the flats on the flange 27 of the nipple 25 to engage such side walls and cam the same outwardly.

Figure 4:
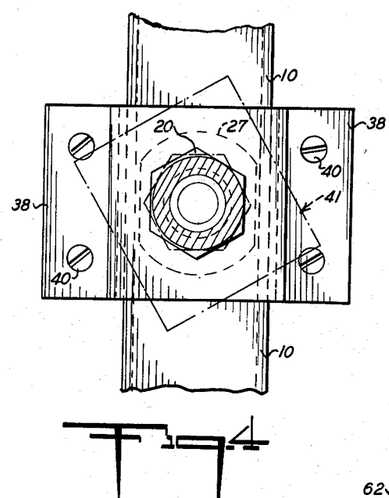
Fig. 4, a sectional view on the line 4—4 of Fig. 3 and showing the manner of adjusting the locking plate which serves to prevent relative rotation between the stand-pipe and the conduit.
Figure 5:
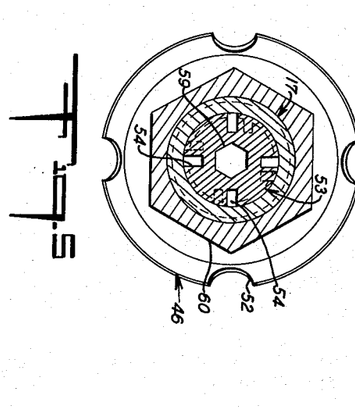
Fig. 5, a sectional view on the line 5—5 of Fig. 3 and showing details of the spray head and earth-engaging flange attached to the upper end of the stand-pipe.
Figure 6:
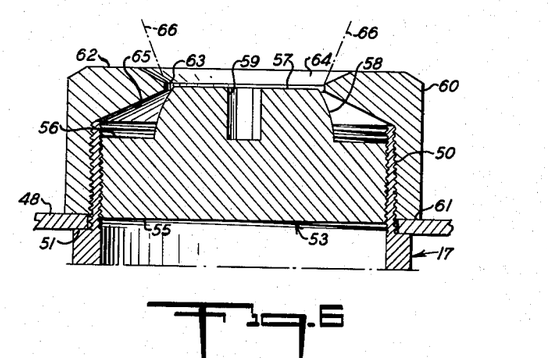
Fig. 6, a fragmentary sectional view to an enlarged scale showing the details of the spray head and the trajectory of the water emanating therefrom in one position of adjustment of such spray head.
Figure 7:
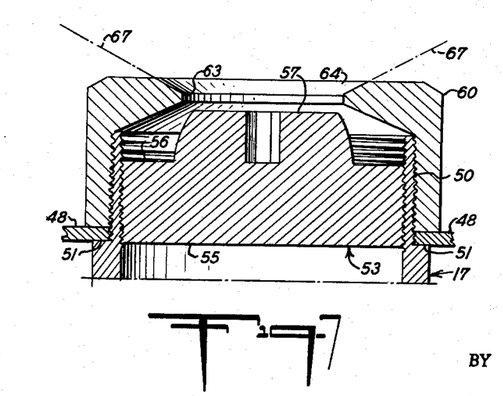
Fig. 7, a view similar to Fig. 6 and showing the trajectory of the water in another position of adjustment of the spray head.

It will be obvious that by the above described structure and operation, the standpipe 17 may be conveniently assembled with the conduit 10 and relative rotation between such standpipe and the conduit 10 effectively prevented except when desired, by releasing the locking plate 41. The locking plate 41 is shown in an intermediate position in Fig. 4 and for purposes of illustration, it is assumed that this position represents the condition existing when the pipe 20 has been securely tightened on the nipple 25 and thereafter the plate 41 is positioned in the annular groove 24 to allow rotation of the same to a position where the flanges 43 are in alignment or parallel with the legs 37 of the bracket 34. Thereafter the stand-pipe 20 may be securely locked with relation to the nipple 25, as described above.

As best shown in Figs. 2, 3, 5, 6 and 7, the spray head 18 may well include a cup-shaped flange 46 having an annular skirt 47 adapted to engage the surface 14 of the earth 12, as shown in Fig. 1, there being provided a central cup-shaped portion 48 having an aperture 49 therein, received over the threaded end 50 of the standpipe 17 and engaging a shoulder 51 provided thereon. The cup-shaped portion 48 may be provided with drainage apertures 52 to permit drainage of water from the cup-shaped portion 48 of the flange 46.

The cup-shaped flange 46 serves to provide an extended bearing area engaging the surface of the earth which resists depression of the same and the upper end of the standpipe 17 below the surface of the earth upon the application of a downward force on the flange or standpipe from above the surface of the earth. This further supplements the laterally extending flanges 38 on the bracket 34 in the resisting downward movement.

The laterally extending flanges 38 on the bracket 34 are embedded in the earth and will operate to resist rotation of the conduit 10 about its axis due to torque generated by a lateral force applied to the cup-shaped flange 46 or the upper end of the standpipe 17 from above the surface of the earth such as might be occasioned by a person kicking the same or by impact from a lawnmower or other implement. Thus, inadvertent displacement of the system is substantially prevented.

A plug 53 is threadedly received in the upper end of the standpipe 17 and plug 53 is provided with a plurality of inclined grooves 54 in the periphery thereof, such grooves extending between the lower end face 55 and the upper end face 56. Projecting above the upper end face 56 and concentric with the plug 53 is a convexly curved dome shaped boss 57. In the preferred embodiment the outer surface 58 of the dome shaped boss 57 is substantially spherical in shape. There is also provided in the boss 57 a polygonal recess 59 for receiving a tool such as an Allen Wrench to permit convenient adjustment of the plug 53 in the upper end of the standpipe 17.

A nut 60 is threadedly received on the upper end of the standpipe 17 and the end surface 61 of the nut 60 engages the cup-shaped portion 48 of the flange 46 and serves to securely clamp the same in position on the standpipe 17. The nut 60 is also provided with an inwardly extending flange 62 and this flange is provided with a central aperture 63 of less diameter than the maximum diameter of the spherical surface 58, but of greater diameter than the minimum diameter of such spherical surface 58. The outer end surface of the nut 60 is provided with an inclined or flared portion 64 extending from the aperture 63 outwardly and the inner surface 65 of the flange 62 is inclined outwardly and downwardly and in spaced relation to the end face 56 of the plug 53 to provide an overhanging lip of substantially V-shape in cross section. The inclined inner surface 65 of the flange 62 provides a recess for receiving a portion of the dome shaped boss 57 depending on the adjusted position of the plug 53.

Figure 8:
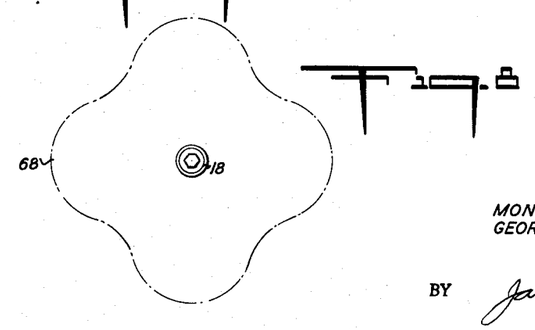
Fig. 8, a top plan view showing the coverage pattern of water sprayed from the heads of this invention.

In operation water flows upwardly through the standpipe 17 and through the inclined grooves 54 in the periphery of the plug 53 which imparts a whirling or spinning motion to such water, which thereafter flows outwardly between the flange 62 and the upper face 56 of the plug 53 and through the aperture 63 in the flange 62 of the nut 60. With the plug in the position shown in Fig. 6, the trajectory of the water spray is indicated by the dot-dash lines 66 and this trajectory is the resultant of the centrifugal force developed in the spray by reason of the whirling motion thereof, and the velocity of such spray emanating from the aperture 63. Obviously, adjustment of the plug 53 will vary the area of the orifice provided by the aperture 63 and with the plug adjusted to the position shown in Fig. 7, the velocity of the water spray will be reduced due to the increase in area of the orifice provided by the aperture 63 and the trajectory of the spray will consequently be lowered and is substantially the same as the inclination of the surface 64, as indicated by the dot-dash lines 67. Since the trajectory of the spray is dependent upon both the velocity and the centrifugal force of the spray, it will be obvious that with variations in water pressure, the velocity will change which would consequently change the trajectory of the spray and adversely affect the coverage thereof. Consequently by adjusting the plug 53, the coverage area may be maintained substantially constant regardless of variations of water pressure in the system.

Where four inclined grooves 54 are provided in the plug 53, the coverage pattern is substantially as shown in Fig. 8, which is generally rectangular with arcuate lobes 68 substantially opposite each groove 54 which results in a generally oval square pattern. If desired, the standpipe 17 and spray heads 18 may be so spaced in the conduit 10 and so located in the earth, as to provide overlapping patterns and complete coverage of the desired space.

It is further to be noted, that the nut 60 may be conveniently removed from the standpipe 17 to permit removal of the plug 53 for cleaning, repair or replacement. Even though the nut 60 may be tightly received on the standpipe 17 or the threads corroded, removal of the same is possible without loosening the joints between such standpipe 17 and the nipple 25, since rotation of the standpipe 17 is prevented by the locking plate 41. This is a material advantage in buried systems, since if the joint between the standpipe and the conduit is loosened, it is frequently necessary to dig up the system in order to effect repairs thereon.

While it may be convenient to install some sprinkler systems as shown in Fig. 1, with a portion 13 of the conduit 10 extending above the ground and connected to the sillcock 16 of the dwelling or other building, in other instances it may be necessary to install the system at some little distance from the wall of a building where a sillcock is commonly located and it also frequently happens that a sidewalk may extend around the building close to the wall thereof, and the sprinkler system must be installed in the ground on the other side of such walk from the building. In installations of this type, it is highly desirable to provide some means for conveniently connecting the system to the sillcock of the house or building and to disconnect the system when not in use, and for this reason, there is provided an inlet or supply fitting which may be conveniently utilized in connection with a system similar to that described above and shown in Fig. 1. Such a system is shown in Fig. 9, and insofar as the sprinkler system itself is concerned, may include the same conduit 10, coupling 11, cap 19 at the end of the conduit and a plurality of upstanding standpipes 17 carrying spray heads 18 at the upper ends thereof.

Figure 9:
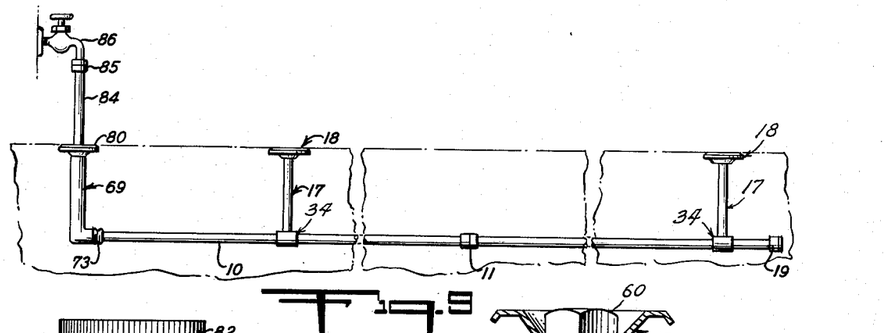
Fig. 9, a side elevational view similar to Fig. 1, and showing a sprinkler system constructed in accordance with this invention and installed in operative position in the earth and also showing an inlet or supply fitting attached to the sprinkler system and in position to facilitate connection of the system to the water supply of a dwelling or other building adjacent thereto.
Figure 10:
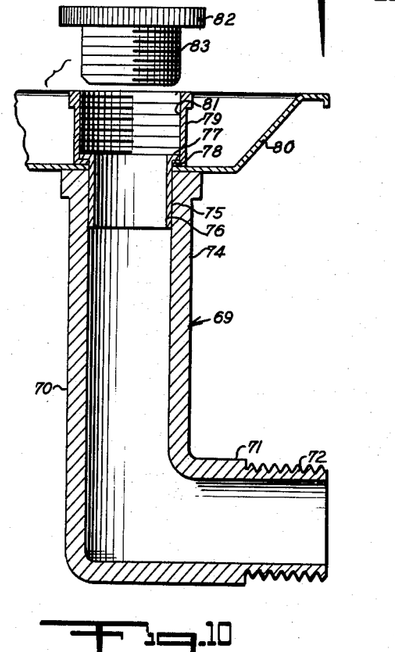
Fig. 10, a side elevational view with parts in section for greater clarity and showing the detailed construction of the inlet or supply fitting.

An inlet or supply fitting 69 is shown in Fig. 9, connected to the sprinkler system and is shown in more detail in Fig. 10. Such fitting 69 may well comprise a body 70 which may be cast from a suitable metal, or made in any other convenient manner, of a desirable material and the body 70 is provided at one end thereof with a relatively short portion 71 terminating in a screw threaded portion 72 which may be conveniently attached to a coupling 73 on the end of the conduit 10. The body 70 is also provided with a relatively long portion 74 disposed at substantially right angles to the short portion 71 and the upper end of the portion 74 may be provided with a bore 75 into which is fitted a thimble 76. The thimble 76 is provided at the upper end thereof, with an annular flange 77 which serves to engage an annular flange 78 on a conventional hose coupling 79 and rotatably mount the same on the fitting 69.

Mounted on the upper end of the portion 74 of the fitting 69 beneath the coupling 79 is a cupshaped flange 80 which serves to surround and protect the coupling 79 and to engage the surface of the earth and prevent burying of the fitting 69 too deeply in the ground, as the result of a person stepping on the same, or for any other reason. The coupling 79 is provided with internal threads 81 and there is also provided a closure plug 82 having a threaded portion 83 for reception in the threads 81 of the coupling 79 to close the same and prevent the entry of foreign matter into the inlet or supply fitting 69. When it is desired to utilize the spray system, the plug 82 is removed and a suitable length of hose or other conduit 74 is connected to the coupling 79 and by means of a coupling 85, to a sillcock or other source of water supply 86. As will be seen, the inlet or supply fitting 69, described above, provides a convenient means whereby the sprinkler system of this invention may be installed at any desired location and conveniently connected to a source of water supply by merely connecting a hose or other conduit of the necessary length thereto and to a suitable water supply.

Figure 11:
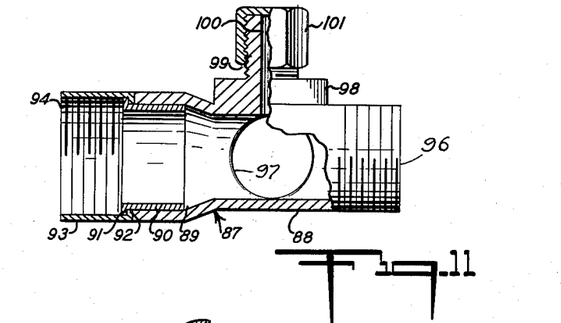
Fig. 11, a side elevational view with parts in section for greater clarity and showing a multiple cross fitting for use in a sprinkler system constructed in accordance with the present invention to permit the convenient attachment of branches to such system, as well as the attachment of a stand-pipe and spray head to the fitting.

From time to time, it may be desirable to add sections to a sprinkler installation and for this purpose, there is provided a multiple fitting or cross 87, as shown in Figs. 11 and 12, and this cross 87 may well comprise a body 88 of cast metal or any other suitable material formed in a convenient manner, such body being hollow and being provided with an inlet opening 89 into which is press-fitted a thimble 90. Thimble 90 is provided at its outer end with an annular flange 91 which serves to engage a flange 92 on a coupling 93 which is provided with internal threads 94 and the coupling 93 is thereby rotatably mounted on the body 88 of the fitting 87 and serves to conveniently attach the conduit 10 thereto. A plurality of outlets 95, 96 and 97 are provided on the cross or multiple fitting 87 and any one or all of these outlets may be utilized and any that are not connected to another conduit may be covered by a suitable cap.

Since it is sometimes desirable to locate a standpipe and spray head at the cross or multiple fitting 87, there is provided on the upper side thereof, a generally rectangular boss 98 from the center of which projects a threaded nipple 99 having a bore 100 communicating with the interior of the body 88. If the nipple 99 is not to be utilized to connect a standpipe thereto, the same may be covered by a screw threaded cap 101, but with the cap 101 removed, a standpipe 17 carrying a spray head 18 may be threadedly received on the nipple 99 with the locking plate 41 received on the standpipe 17 and with the flanges 43 of the locking plate 41 engaging the sides of the rectangular boss 98 to prevent relative rotation between the standpipe 17 and the body 88 of the multiple fitting 87.

A standpipe 17 and spray head 18 may be conveniently positioned at any point along the conduit 10 and may be assembled therewith in water tight relation, by a novel method which is shown in detail in Figs. 13 to 16 inclusive. In this assembling operation, it is first necessary to form an aperture 31 in the wall 32 of the conduit 10 and this may be conveniently accomplished by means of a heated punch 102 which may be attached to a conventional electric soldering iron 103, or may be heated in any other desired manner. In order to accurately locate the aperture 31 in the wall 32 and to materially assist in forming such aperture, there may be provided a jig in the form of a member 104 of generally channel cross section, having a web 105 provided with an aperture 106 therein, there being spaced substantially parallel legs 106 extending from opposite edges of the web 105, and serving to embrace the side walls 33 of the conduit 10. Jig 104 serves to accurately locate the punch 102 and it is merely necessary to pass such punch through the aperture 102 in the web 105 to form the aperture 31 in the wall 32 of the conduit 10.

Figure 14:
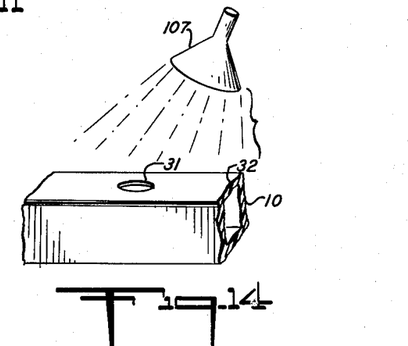
Fig. 14, a perspective view showing the second step in the method of assembly involving the heating of the conduit wall surrounding the aperture in order to soften the same.
Figure 15:
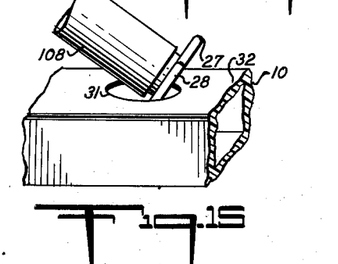
Fig. 15, a view in perspective showing a further step in the assembly of a nipple and stand-pipe with the conduit.
Figure 16:
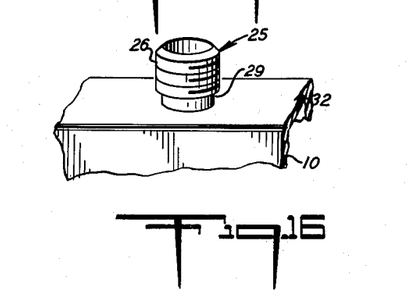
Fig. 16, a view in perspective showing the nipple installed in the conduit preparatory to attaching the stand-pipe thereto.

Since the conduit 10 is formed of a plastic material, the same may be softened by heat, and for this purpose the area of the wall 32 surrounding the aperture 10, may be subjected to heat rays from an infra-red lamp 107 or other suitable heat source which will serve to soften the material of the wall 32 and permit the convenient completion of the next step of the assembly operation. This next step, which comprises assembly of the nipple 25 with the conduit 10, is accomplished by attaching a suitable manipulating handle 108 to the threaded portion 26 of the nipple 25, and, as shown in Fig. 15, the nipple 25 is held at an angle to the conduit 10 with the flange 27 inclined and in this position a portion of the flange 27 is inserted through the aperture 31 in the wall 32 of the conduit 10, the softened material of such wall permitting expansion of the aperture 31 a sufficient amount for this purpose. After approximately one-half of the flange 27 has passed through the aperture 31, the nipple 25 is tilted to a position substantially at right angles to the longitudinal axis of the conduit 10 by means of the handle 108 and at the same time, the remainder of the flange 27 is forced through the aperture 31. The nipple 25 is then positioned with the flats 28 engaging the side walls 33 of the conduit 10 and with the portion of the wall 32 surrounding the aperture 31 received in the annular groove 29 of the nipple 25 to retain such nipple in position until the standpipe 17 is secured thereto, as fully described above.

It will therefore be seen that by this method, nipples 25 may be conveniently and rapidly assembled with the conduit 10 at any desired location and that such nipples will be retained in position until such time as the standpipe 17 is attached thereto.

The invention described above, serves to provide a sprinkler system which may be conveniently and economically pre-fabricated and sold as a unit and which may be conveniently installed by the homeowner with a minimum of excavating or digging. Furthermore, the system permits convenient and rapid repair of the spray heads without danger of breaking the fluid tight connection between the standpipes on which the spray heads are mounted and the conduit buried in the earth, and likewise, the spray heads are of such a nature that the same may be adjusted to provide a substantially uniform coverage area, regardless of variations in water pressure. Furthermore, any number of sprinkler units constructed in accordance with this invention may be connected together to provide a desired coverage and the square cross section conduit utilized therein, permits a maximum flow of water and at the same time, materially facilitates the mounting of the standpipes on such conduit.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A sprinkler system comprising a flexible non-metallic conduit of substantially square cross section, a plurality of spray unit asemblies connected to said conduit at spaced intervals, each assembly comprising a nipple having an exteriorly threaded portion, a flange at one end of said nipple, opposed flats on the peripheral edge of said flange, an annular groove in said nipple between said threads and the upper surface of said flange, an annular recess in the upper surface of said flange and having an outer diameter greater than the diameter of said threaded portion, one wall of said conduit having an aperture of a diameter less than the diameter of said threaded portion, said nipple extending through said aperture and with a portion of said conduit surrounding said aperture disposed in said annular groove, said flange being disposed within said conduit with said flats engaging opposite walls to prevent rotation of said nipple relative to said conduit, a bracket of channel cross section having a web and spaced substantially parallel legs terminating in outwardly extending flanges, said web having an aperture and being disposed transversely of said conduit with said nipple extending through said aperture and with said legs tightly embracing the side walls of said conduit to prevent outward movement of said walls by said flats upon rotation of said nipple relative to said conduit, a strap bridging said legs and secured to said outwardly extending flanges to prevent spreading of said legs and secure said bracket on said conduit, an elongated stand-pipe having a polygonal outer surface, the opposite ends of said pipe being interiorly threaded, a reduced cylindrical portion at one end of said pipe providing a shoulder, said one end being threadedly received on said nipple with said reduced portion extending through the aperture in said web and engaging the wall of said conduit to force the same into said annular recess and provide a fluid tight joint and with said shoulder engaging said web to clamp the same to said conduit, a locking plate having a polygonal aperture slidably receiving said pipe, flanges at opposite ends of said plate, whereby with said plate in engagement with said web said flanges will embrace said legs to prevent rotation of said pipe relative to said bracket, an annular groove in the outer surface of said pipe spaced from said shoulder a distance greater than the length of said last named flanges whereby the aperture in said plate may be disposed in said last named groove to permit rotation of said plate relative to said pipe and a spray head threadedly received in the opposite end of said pipe and a fluid supply fitting comprising a hollow body having a relatively short portion connected to one end of said conduit and a relatively long portion disposed at substantially right angles to said short portion, a cup-shaped flange at the free end of said long portion, a coupling on the free end of said long portion within said cup-shaped flange and a removable plug in said coupling to prevent the entry of foreign matter whereby said conduit may be buried in the earth with said spray heads and said cup-shaped flange at the surface, said spray heads being removable and replaceable without danger of breaking the joint between said standpipes and said conduit.

2. A sprinkler system comprising a flexible non-metallic conduit of substantially square cross section, a plurality of spray unit assemblies connected to said conduit at spaced intervals, each assembly comprising a nipple having an exteriorly threaded portion, a flange at one end of said nipple, opposed flats on the peripheral edge of said flange, an annular groove in said nipple between said threads and the upper surface of said flange, an annular recess in the upper surface of said flange and having an outer diameter greater than the diameter of said threaded portion, one wall of said conduit having an aperture of a diameter less than the diameter of said threaded portion, said nipple extending through said aperture and with a portion of said conduit surrounding said aperture disposed in said annular groove, said flange being disposed within said conduit with said flats engaging opposite walls to prevent rotation of said nipple relative to said conduit, a bracket of channel cross section having a web and spaced substantially parallel legs terminating in outwardly extending flanges, said web having an aperture and being disposed transversely of said conduit with said nipple extending through said aperture and with said legs tightly embracing the side walls of said conduit to prevent outward movement of said walls by said flats upon rotation of said nipple relative to said conduit, a strap bridging said legs and secured to said outwardly extending flanges to prevent spreading of said legs and secure said bracket on said conduit, an elongated stand-pipe having a polygonal outer surface, the opposite ends of said pipe being interiorly threaded, a reduced cylindrical portion at one end of said pipe providing a shoulder, said one end being threadedly received on said nipple with said reduced portion extending through the aperture in said web and engaging the wall of said conduit to force the same into said annular recess and provide a fluid tight joint and with said shoulder engaging said web to clamp the same to said conduit, a locking plate having a polygonal aperture slidably receiving said pipe, flanges at opposite ends of said plate, whereby with said plate in engagement with said web said flanges will embrace said legs to prevent rotation of said pipe relative to said bracket, an annular groove in the outer surface of said pipe spaced from said shoulder a distance greater than the length of said last named flanges whereby the aperture in said plate may be disposed in said last named groove to permit rotation of said plate relative to said pipe and a spray head threadedly received in the opposite end of said pipe and a fluid supply fitting comprising a hollow body having a relatively short portion connected to one end of said conduit and a relatively long portion disposed at substantially right angles to said short portion, a flange at the free end of said long portion and a coupling on the free end of said long portion whereby said conduit may be buried in the earth with said spray heads and said last named flange at the surface, said spray heads being removable and replaceable without danger of breaking the joint between said standpipes and said conduit.

3. A sprinkler system comprising a flexible non-metallic conduit of substantially square cross section, a plurality of spray unit assemblies connected to said conduit at spaced intervals, each assembly comprising a nipple having an exteriorly threaded portion, a flange at one end of said nipple, opposed flats on the peripheral edge of said flange, an annular groove in said nipple between said threads and the upper surface of said flange, an annular recess in the upper surface of said flange and having an outer diameter greater than the diameter of said threaded portion, one wall of said conduit having an aperture of a diameter less than the diameter of said threaded portion, said nipple extending through said aperture and with a portion of said conduit surrounding said aperture disposed in said annular groove, said flange being disposed within said conduit with said flats engaging opposite walls to prevent rotation of said nipple relative to said conduit, a bracket of channel cross section having a web and spaced substantially parallel legs terminating in outwardly extending flanges, said web having an aperture and being disposed transversely of said conduit with said nipple extending through said aperture and with said legs tightly embracing the side walls of said conduit to prevent outward movement of said walls by said flats upon rotation of said nipple relative to said conduit, a strap bridging said legs and secured to said outwardly extending flanges to prevent spreading of said legs and secure said bracket on said conduit, an elongated stand-pipe having a polygonal outer surface, the opposite ends of said pipe being interiorly threaded, a reduced cylindrical portion at one end of said pipe providing a shoulder, said one end being threadedly received on said nipple with said reduced portion extending through the aperture in said web and engaging the wall of said conduit to force the same into said annular recess and provide a fluid tight joint and with said shoulder engaging said web to clamp the same to said conduit, a locking plate having a polygonal aperture slidably receiving said pipe, flanges at opposite ends of said plate, whereby with said plate in engagement with said web said flanges will embrace said legs to prevent rotation of said pipe relative to said bracket, an annular groove in the outer surface of said pipe spaced from said shoulder a distance greater than the length of said last named flanges whereby the aperture in said plate may be disposed in said last named groove to permit rotation of said plate relative to said pipe and a spray head threadedly received in the opposite end of said pipe and a fluid supply fitting connected to one end of said conduit whereby said conduit may be buried in the earth with said spray heads being removable and replaceable without danger of breaking the joint between said stand-pipes and said conduit.

4. A sprinkler system comprising a flexible non-metallic conduit of substantially square cross section, a plurality of spray unit assemblies connected to said conduit at spaced intervals, each assembly comprising a nipple having an exteriorly threaded portion, a flange at one end of said nipple, opposed flats on the peripheral edge of said flange, an annular groove in said nipple between said threads and the upper surface of said flange, an annular recess in the upper surface of said flange and having an outer diameter greater than the diameter of said threaded portion, one wall of said conduit having an aperture of a diameter less than the diameter of said threaded portion, said nipple extending through said aperture and with a portion of said conduit surrounding said aperture disposed in said annular groove, said flange being disposed within said conduit with said flats engaging opposite walls to prevent rotation of said nipple relative to said conduit, a bracket of channel cross section having a web and spaced substantially parallel legs terminating in outwardly extending flanges, said web having an aperture and being disposed transversely of said conduit with said nipple extending through said aperture and with said legs tightly embracing the side walls of said conduit to prevent outward movement of said walls by said flats upon rotation of said nipple relative to said conduit, a strap bridging said legs and secured to said outwardly extending flanges to prevent spreading of said legs and secure said bracket on said conduit, an elongated stand-pipe having a polygonal outer surface, the opposite ends of said pipe being interiorly threaded, a reduced cylindrical portion at one end of said pipe providing a shoulder, said one end being threadedly received on said nipple with said reduced portion extending through the aperture in said web and engaging the wall of said conduit to force the same into said annular recess and provide a fluid tight joint and with said shoulder engaging said web to clamp the same to said conduit, a locking plate having a polygonal aperture slidably receiving said pipe, flanges at opposite ends of said plate, whereby with said plate in engagement with said web said flanges will embrace said legs to prevent rotation of said pipe relative to said bracket, an annular groove in the outer surface of said pipe spaced from said shoulder a distance greater than the length of said last named flanges whereby the aperture in said plate may be disposed in said last named groove to permit rotation of said plate relative to said pipe and a spray head threadedly received in the opposite end of said pipe whereby said conduit may be buried in the earth with said spray heads at the surface, said spray heads being removable and replaceable and without danger of breaking the joint between said stand-pipes and said conduit.

5. A sprinkler system comprising a flexible non-metallic conduit of substantially square cross section, a plurality of spray unit assemblies connected to said conduit at spaced intervals, each assembly comprising a nipple having an exteriorly threaded portion, a flange at one end of said nipple, opposed flats on the peripheral edge of said flange, an annular groove in said nipple between said threads and the upper surface of said flange, an annular recess in the upper surface of said flange, one wall of said conduit having an aperture of a diameter less than the diameter of said threaded portion, said nipple extending through said aperture and with a portion of said conduit surrounding said aperture disposed in said annular groove, said flange being disposed within said conduit with said flats engaging opposite walls to prevent rotation of said nipple relative to said conduit, a bracket of channel cross section having a web and spaced substantially parallel legs terminating in outwardly extending flanges, said web having an aperture and being disposed transversely of said conduit with said nipple extending through said aperture and with said legs tightly embracing the side walls of said conduit to prevent outward movement of said walls by said flats upon rotation of said nipple relative to said conduit, a strap bridging said legs and secured to said outwardly extending flanges to prevent spreading of said legs and secure said bracket on said conduit, an elongated standpipe having a polygonal outer surface, the opposite ends of said pipe being interiorly threaded, a reduced cylindrical portion at one end of said pipe providing a shoulder, said one end being threadedly received on said nipple with said reduced portion extending through the aperture in said web and engaging the wall of said conduit to force the same into said annular recess and provide a fluid tight joint and with said shoulder engaging said web to clamp the same to said conduit, a locking plate having a polygonal aperture slidably receiving said pipe, flanges at opposite ends of said plate, whereby with said plate in engagement with said web said flanges will embrace said legs to prevent rotation of said pipe relative to said bracket, an annular groove in the outer surface of said pipe spaced from said shoulder a distance greater than the length of said last named flanges whereby the aperture in said plate may be disposed in said last named groove to permit rotation of said plate relative to said pipe and a spray head threadedly received in the opposite end of said pipe whereby said conduit may be buried in the earth with said spray heads at the surface, said spray heads being removable and replaceable without danger of breaking the joint between said stand-pipes and said conduit.

6. A sprinkler system comprising a non-metallic conduit of substantially square cross section, a plurality of spray unit assemblies connected to said conduit at spaced intervals, each assembly comprising a nipple having an exteriorly threaded portion, a flange at one end of said nipple, opposed flats on the peripheral edge of said flange, an annular groove in said nipple between said threads and the upper surface of said flange, one wall of said conduit having an aperture of a diameter less than the diameter of said threaded portion, said nipple extending through said aperture and with a portion of said conduit surrounding said aperture disposed in said annular groove, said flange being disposed within said conduit with said flats engaging opposite walls to prevent rotation of said nipple relative to said conduit, a bracket of channel cross section having a web and spaced legs, said web having an aperture and being disposed transversely of said conduit with said nipple extending through said aperture and with said legs tightly embracing the side walls of said conduit to prevent outward movement of said walls by said flats upon rotation of said nipple relative to said conduit, a strap bridging said legs and secured thereto to prevent spreading of said legs and secure said bracket on said conduit, an elongated stand-pipe having a polygonal outer surface, the opposite ends of said pipe being interiorly threaded, a reduced cylindrical portion at one end of said pipe providing a shoulder, said one end being threadedly received on said nipple with said reduced portion extending through the aperture in said web and engaging the wall of said conduit to force the same against said flange and provide a fluid tight joint and with said shoulder engaging said web to clamp the same to said conduit, a locking plate having a polygonal aperture slidably receiving said pipe, flanges at opposite ends of said plate, whereby with said plate in engagement with said web said flanges will embrace said legs to prevent rotation of said pipe relative to said bracket, an annular groove in the outer surface of said pipe spaced from said shoulder a distance greater than the length of said last named flanges whereby the aperture in said plate may be disposed in said last named groove to permit rotation of said plate relative to said pipe and a spray head threadedly received in the opposite end of said pipe whereby said conduit may be buried in the earth with said spray heads at the surface, said spray heads being removable and replaceable without danger of breaking the joint between said stand-pipes and said conduit.

7. A sprinkler system comprising a non-metallic conduit of substantially square cross section, a plurality of spray unit assemblies connected to said conduit at spaced intervals, each assembly comprising a nipple having an exteriorly threaded portion, a flange at one end of said nipple, opposed flats on the peripheral edge of said flange, an annular groove in said nipple between said threads and the upper surface of said flange, one wall of said conduit having an aperture of a diameter less than the diameter of said threaded portion, said nipple extending through said aperture and with a portion of said conduit surrounding said aperture disposed in said annular groove, said flange being disposed within said conduit with said flats engaging opposite walls to prevent rotation of said nipple relative to said conduit, a bracket of channel cross section having a web and spaced legs said web having an aperture and being disposed transversely of said conduit with said nipple extending through said aperture and with said legs tightly embracing the side walls of said conduit to prevent outward movement of said walls by said flats upon rotation of said nipple relative to said conduit, a strap bridging said legs and secured thereto to prevent spreading of said legs and secure said bracket on said conduit, an elongated stand-pipe having a polygonal outer surface the opposite ends of said pipe being interiorly threaded, said one end being threadedly received on said nipple and engaging said web to clamp the same to said conduit, a locking plate having a polygonal aperture slidably receiving said pipe, a flange on said plate, whereby with said plate in engagement with said web said flange will engage one of said legs to prevent rotation of said pipe relative to said bracket, an annular groove in the outer surface of said pipe spaced from said shoulder a distance greater than the length of said last named flange whereby the aperture in said plate may be disposed in said last named groove to permit rotation of said plate relative to said pipe and a spray head threadedly received in the opposite end of said pipe whereby said conduit may be buried in the earth with said spray heads at the surface, said spray heads being removable and replaceable without danger of breaking the joint between said stand-pipes and said conduit.

8. A sprinkler system comprising a non-metallic conduit of substantially square cross section, a plurality of spray unit assemblies connected to said conduit at spaced intervals, each assembly comprising a nipple having an exteriorly threaded portion, a flange at one end of said nipple, opposed flats on the peripheral edge of said flange, an annular groove in said nipple between said threads and the upper surface of said flange, one wall of said conduit having an aperture of a diameter less than the diameter of said threaded portion, said nipple extending through said aperture and with a portion of said conduit surrounding said aperture disposed in said annular groove, said flange being disposed within said conduit with said flats engaging opposite walls to prevent rotation of said nipple relative to said conduit, a bracket of channel cross section having a web and spaced legs said web having an aperture and being disposed transversely of said conduit with said nipple extending through said aperture and with said legs tightly embracing the side walls of said conduit to prevent outward movement of said walls by said flats upon rotation of said nipple relative to said conduit, a strap bridging said legs and secured thereto to prevent spreading of said legs and secure said bracket on said conduit, an elongated stand-pipe, the opposite ends of said pipe being interiorly threaded, said one end being threadedly received on said nipple and engaging said web to clamp the same to said conduit, a locking plate having an aperture and being slidably and non-rotatably received on said pipe and bracket engaging means on said plate, whereby with said plate in engagement with said web said means will engage said bracket to prevent rotation of said pipe relative to said bracket, an annular groove in the outer surface of said pipe whereby the aperture in said plate may be disposed in said last named groove to permit rotation of said plate relative to said pipe and a spray head threadedly received in the opposite end of said pipe whereby said conduit may be buried in the earth with said spray heads at the surface, said spray heads being removable and replaceable without danger of breaking the joint between said stand-pipes and said conduit.

9. A sprinkler system comprising a non-metallic conduit of substantially square cross section, a plurality of spray unit assemblies connected to said conduit at spaced intervals, each assembly comprising a nipple having an exteriorly threaded portion, a flange at one end of said nipple, opposed flats on the peripheral edge of said flange, an annular groove in said nipple between said threads and the upper surface of said flange, one wall of said conduit having an aperture of a diameter less than the diameter of said threaded portion, said nipple extending through said aperture and with a portion of said conduit surrounding said aperture disposed in said annular groove, said flange being disposed within said conduit with said flats engaging opposite walls to prevent rotation of said nipple relative to said conduit, a bracket of channel cross section having a web and spaced legs said web having an aperture and being disposed transversely of said conduit with said nipple extending through said aperture and with said legs tightly embracing the side walls of said conduit to prevent outward movement of said walls by said flats upon rotation of said nipple relative to said conduit, an elongated stand-pipe, the opposite ends of said pipe being interiorly threaded, said one end being threadedly received on said nipple and engaging said web to clamp the same to said conduit, a locking plate having an aperture and being slidably and non-rotatably received on said pipe and bracket engaging means on said plate, whereby with said plate in engagement with said web said means will engage said bracket to prevent rotation of said pipe relative to said bracket, an annular groove in the outer surface of said pipe whereby the aperture in said plate may be disposed in said last named groove to permit rotation of said plate relative to said pipe and a spray head threadedly received in the opposite end of said pipe whereby said conduit may be buried in the earth with said spray heads at the surface, said spray heads being removable and replaceable without danger of breaking the joint between said stand-pipes and said conduit.

10. A sprinkler system comprising a non-metallic conduit of substantially square cross section, a plurality of spray unit assemblies connected to said conduit at spaced intervals, each assembly comprising a nipple having an exteriorly threaded portion, a flange at one end of said nipple, an annular groove in said nipple between said threads and the upper surface of said flange, one wall of said conduit having an aperture of a diameter less than the diameter of said threaded portion, said nipple extending through said aperture and with a portion of said conduit surrounding said aperture disposed in said annular groove, said flange being disposed within said conduit, means to prevent rotation of said nipple relative to said conduit, a bracket of channel cross section having a web and spaced legs said web having an aperture and being disposed transversely of said conduit with said nipple extending through said aperture and with said legs tightly embracing the side walls of said conduit, an elongated stand-pipe, the opposite ends of said pipe being interiorly threaded, said one end being threadedly received on said nipple and engaging said web to clamp the same to said conduit, releasable locking means to prevent rotation of said pipe relative to said bracket and a spray head threadedly received in the opposite end of said pipe whereby said conduit may be buried in the earth with said spray heads at the surface, said spray heads being removable and replaceable without danger of breaking the joint between said stand-pipes and said conduit.

11. An adjustable spray head assembly for buried sprinkler systems, said assembly comprising a standpipe to be buried in the earth, the upper end of said pipe having a reduced exteriorly threaded portion providing a shoulder, the upper end of said pipe being interiorly threaded, a plug threadedly received in the upper end of said pipe, a plurality of inclined grooves in the periphery of said plug extending between the opposite end faces, a concentric boss of reduced diameter on the upper end face of said plug, the peripheral surface of said boss being substantially spherical, an outwardly opening axially disposed recess in said boss for receiving an adjusting tool, a cup-shaped flange for engaging the surface of the earth and received on said reduced portion and a nut threadedly received on said reduced portion and clamping said flange against said shoulder, said nut including an inwardly extending annular flange at the upper end, a central bore in said annular flange having a diameter greater than the minimum diameter but less than the maximum diameter of said boss, the outer surface of said annular flange being inclined outwardly from said bore and the inner surface of said annular flange being inclined inwardly from said bore and spaced from the upper end face of said plug to provide an overhanging lip substantially V-shape in cross section whereby upon adjustment of said plug and boss toward or from said annular flange to vary the area of the orifice provided by said bore, the trajectory of fluid sprayed upwardly and radially outwardly from said bore will be raised or lowered to maintain the area covered by said fluid spray substantially constant regardless of variations in fluid pressure in said stand-pipe.

12. An adjustable spray head assembly for buried sprinkler systems, said assembly comprising a stand-pipe to be buried in the earth, the upper end of said pipe having an exteriorly threaded portion, the upper end of said pipe being interiorly threaded, a plug threadedly received in the upper end of said pipe, a plurality of inclined grooves in the periphery of said plug extending between the opposite end faces, a concentric boss of reduced diameter on the upper end face of said plug, the peripheral surface of said boss being substantially spherical, an outwardly opening axially disposed recess in said boss for receiving an adjusting tool and a nut threadedly received on said pipe, said nut including an inwardly extending annular flange at the upper end, a central bore in said annular flange having a diameter greater than the minimum diameter but less than the maximum diameter of said boss, the outer surface of said annular flange being inclined outwardly from said bore and the inner surface of said annular flange being inclined inwardly from said bore and spaced from the upper end face of said plug to provide an overhanging lip substantially V-shape in cross section whereby upon adjustment of said plug and boss toward or from said annular flange to vary the area of the orifice provided by said bore, the trajectory of fluid sprayed upwardly and radially outwardly from said bore will be raised or lowered to maintain the area covered by said fluid spray substantially constant regardless of variations in fluid pressure in said stand-pipe.

13. An adjustable spray head assembly for buried sprinkler systems, said assembly comprising a stand-pipe to be buried in the earth, the upper end of said pipe having an exteriorly threaded portion, the upper end of said pipe being interiorly threaded, a plug threadedly received in the upper end of said pipe, a plurality of inclined grooves in the periphery of said plug extending between the opposite end faces, a concentric dome shaped boss of reduced diameter on the upper end face of said plug, the peripheral surface of said boss being convexly curved and a nut threadedly received on said pipe, said nut including an inwardly extending annular flange at the upper end, a central bore in said annular flange having a diameter greater than the minimum diameter but less than the maximum diameter of said boss, the outer surface of said annular flange being inclined outwardly from said bore and the inner surface of said annular flange being inclined inwardly from said bore and spaced from the upper end face of said plug to provide an overhanging lip substantially V-shape in cross section whereby upon adjustment of said plug and boss toward or from said annular flange to vary the area of the orifice provided by said bore, the trajectory of fluid sprayed upwardly and radially outwardly from said bore will be raised or lowered to maintain the area covered by said fluid spray substantially constant regardless of variations in fluid pressure in said stand-pipe.

14. An adjustable spray head assembly for buried sprinkler systems, said assembly comprising a stand pipe to be buried in the earth, the upper end of said pipe having an exteriorly threaded portion, the upper end of said pipe being interiorly threaded, a plug threadedly received in the upper end of said pipe, a plurality of inclined grooves in the periphery of said plug extending between the opposite end faces, a concentric dome shaped boss on the upper end face of said plug and a nut threadedly received on said pipe, said nut including an inwardly extending annular flange at the upper end, a central bore in said annular flange having a diameter greater than the minimum diameter but less than the maximum diameter of said boss, the outer surface of said annular flange being inclined outwardly from said bore to provide an overhanging lip whereby upon adjustment of said plug and boss toward or from said annular flange to vary the area of the orifice provided by said bore, the trajectory of fluid sprayed upwardly and radially outwardly from said bore will be raised or lowered to maintain the area covered by said fluid spray substantially constant regardless of variations in fluid pressure in said stand-pipe.

15. An adjustable spray head assembly for buried sprinkler systems, said assembly comprising a stand-pipe to be buried in the earth, the upper end of said pipe having an exteriorly threaded portion, the upper end of said pipe being interiorly threaded, a plug threadedly received in the upper end of said pipe, a plurality of inclined grooves in the periphery of said plug extending between the opposite end faces, a concentric boss of reduced diameter on the upper end face of said plug, the diameter of said boss decreasing from a maximum at said upper end face to a minimum adjacent the outer end of said boss and a nut threadedly received on said pipe, said nut including an inwardly extending annular flange at the upper end, a central bore in said annular flange having a diameter greater than the minimum diameter but less than the maximum diameter of said boss, the outer surface of said annular flange being inclined outwardly from said bore to provide an overhanging lip whereby upon adjustment of said plug and boss toward or from said annular flange to vary the area of the orifice provided by said bore, the trajectory of fluid sprayed upwardly and radially outwardly from said bore will be raised or lowered to maintain the area covered by said fluid spray substantially constant regardless of variations in fluid pressure in said stand-pipe.

16. For use in a buried sprinkler system a multiple fitting and stand-pipe connector comprising a body having an inlet coupling and a plurality of outlet couplings lying in substantially the same plane, a substantially rectangular boss on said body, an exteriorly threaded nipple projecting from said boss substantially centrally thereof and having a bore communicating with the interior of said body, a stand-pipe threadedly attached to said nipple, a spray head on said stand-pipe and a flanged locking plate on said stand-pipe embracing said boss to prevent relative rotation between said stand-pipe and said body.

17. For use in a buried sprinkler system a multiple fitting and stand-pipe connector comprising a body having an inlet coupling and a plurality of outlet couplings, a polygonal boss on said body, an exteriorly threaded nipple projecting from said boss substantially centrally thereof and having a bore communicating with the interior of said body, a stand-pipe threadedly attached to said nipple, a spray head on said stand-pipe and a flanged locking plate on said stand-pipe embracing said boss to prevent relative rotation between said stand-pipe and said body.

18. A sprinkler system comprising a non-metallic conduit of substantially square cross section, a spray unit assembly connected to said conduit, said assembly comprising a nipple having an exteriorly threaded portion, a flange at one end of said nipple, one wall of said conduit having an aperture, said nipple extending through said aperture, said flange being disposed within said conduit, means on said flange engaging said conduit to prevent rotation of said nipple relative to said conduit, a bracket of channel cross section having a web and spaced legs, said web having an aperture and being disposed transversely of said conduit with said nipple extending through said aperture and with said legs engaging the side walls of said conduit, an elongated stand-pipe, one end of said stand-pipe being threadedly received on said nipple and engaging said web to clamp the same to said conduit, releasable locking means to prevent rotation of said pipe relative to said bracket and a spray head secured to the opposite end of said pipe whereby said conduit may be buried in the earth with said spray head at the surface, said spray head being removable and replaceable without danger of breaking the joint between said stand-pipe and said conduit.

19. Fluid distribution means comprising a non-metallic conduit of substantially square cross section, one wall of said conduit having an aperture, a nipple having an exteriorly threaded portion, a flange at one end of said nipple, said nipple extending through said aperture, said flange being disposed within said conduit, a bracket of channel cross section having a web and spaced legs, said web having an aperture and being disposed transversely of said conduit with said nipple extending through said aperture and with said legs engaging the side walls of said conduit, a pipe, one end of said pipe being threadedly received on said nipple and engaging said web to clamp the same to said conduit and releasable locking means to prevent rotation of said pipe relative to said bracket.

20. A sprinkler system comprising a flexible non-metallic conduit adapted to be buried in the earth, a plurality of elongated stand-pipes carried by and extending in the same direction from said flexible conduit and adapted to be buried in the earth together with said flexible conduit and with said stand-pipes disposed in a substantially vertical position, a spray head carried by the upper end of each stand-pipe and adapted to be located at the surface of the earth, said spray head including a spray opening for discharging water upwardly, means providing a water tight connection between the lower end of each stand-pipe and said flexible conduit at intervals along said flexible conduit and means rigidly associated with said first mentioned means for resisting rotation of said conduit about its axis due to torque generated by a lateral force exerted against the upper end of said stand-pipe from a source above the ground, said last mentioned means including a member embracing and engaging a substantial portion of the perimeter of said conduit and having at least one portion extending laterally from said conduit.

21. A sprinkler system comprising a flexible non-metallic conduit adapted to be buried in the earth, a plurality of elongated stand-pipes carried by and extending in the same direction from said flexible conduit and adapted to be buried in the earth together with said flexible conduit and with said stand-pipes disposed in a substantially vertical position, a spray head carried by the upper end of each standpipe and adapted to be located at the surface of the earth, said spray head including a spray opening for discharging water upwardly, a bearing plate secured to said stand-pipe adjacent the upper end thereof and providing an extended bearing area around said spray head for engagement with the surface of the earth to resist depression of said spray head below the surface of the earth due to the application of a downward force from a source above the surface of the earth, means providing a water tight connection between the lower end of each standpipe and said flexible conduit at intervals along said flexible conduit and means rigidly associated with said first mentioned means for resisting rotation of said flexible conduit about its axis due to torque generated by a lateral force exerted against the upper end of said standpipe from a source above the ground, said last mentioned means including a member embracing and engaging a substantial portion of the perimeter of said conduit and having at least one portion extending laterally from said conduit, said laterally extending portion also serving to further resist depression of said spray head.

22. A buried sprinkler system comprising a non-metallic flexible conduit, a plurality of spray unit assemblies connected to said conduit at spaced intervals, a multiple fitting and a stand-pipe connector comprising a body having an inlet coupling connected to one end of said conduit, a plurality of outlet couplings, a polygonal boss on said body, an exteriorly threaded nipple projecting from said boss substantially centrally thereof and having a bore communicating with the interior of said body, a stand-pipe threadedly attached to said nipple, a spray head on said stand-pipe, a flanged locking plate on said stand-pipe embracing said boss to prevent relative rotation between said stand-pipe and said body and a plurality of conduits connected to said outlet couplings.

23. A sprinkler system comprising a flexible non-metallic conduit adapted to be buried in the earth, a plurality of elongated stand-pipes carried by and extending in the same direction from said flexible conduit and adapted to be buried in the earth together with said flexible conduit and with said stand-pipes disposed in a substantially vertical position, a spray head carried by the upper end of each stand-pipe and adapted to be located at the surface of the earth, said spray head including a spray opening for discharging water upwardly, means including an element having a portion inside of said conduit and a portion extending outside of said conduit, said last named portion having means cooperating with the adjacent portion of said stand-pipe for clamping the wall of said flexible conduit in order to provide a water tight connection between the lower end of each stand-pipe and said flexible conduit at intervals along said flexible conduit, the elements of said last named means being relatively rotatable with respect to one another for clamping and means for selectively locking said elements against relative rotation.

24. A sprinkler system comprising a flexible synthetic plastic transversely polygonal conduit adapted to be buried in the earth, a plurality of elongated stand-pipes carried by said flexible conduit and extending from the same side thereof and adapted to be buried in the earth together with said flexible conduit and with said stand-pipes disposed in a substantially vertical position, a spray head carried by the upper end of each stand-pipe and adapted to be located at the surface of the earth, said spray head including a spray opening for discharging water upwardly, brackets conforming to the transverse contour of said flexible conduit for mounting said stand-pipes on said flexible conduit, each of said brackets including portions extending laterally away from said conduit for embedment in the earth to resist rotation of said brackets and conduit about the longitudinal axis of said conduit and means providing a water tight connection between the lower end of each stand-pipe and said flexible conduit at intervals along said flexible conduit.

25. A sprinkler system comprising a flexible synthetic plastic conduit adapted to be buried in the earth, a plurality of elongated stand-pipes carried by and extending in the same direction from said flexible conduit and adapted to be buried in the earth together with said flexible conduit and with said stand-pipes disposed in a substantially vertical position, a spray head carried by the upper end of each stand-pipe and adapted to be located at the surface of the earth, said spray head including a spray opening for discharging water upwardly, and means providing a water tight connection between the lower end of each stand-pipe and said flexible conduit at intervals along said flexible conduit, said last named means comprising a male threaded flanged nipple and the provision of an opening in said flexible conduit through which the threaded portion of the nipple protrudes with said flange within said flexible conduit and a female thread in the lower end of said stand-pipe into which said male threaded nipple screws whereby to clamp the wall of said flexible conduit between said flange and the lower end of said stand-pipe.

26. A sprinkler system comprising a flexible synthetic plastic conduit adapted to be buried in the earth, a plurality of elongated stand-pipes carried by and extending in the same direction from said flexible pipe and adapted to be buried in the earth together with said flexible conduit and with said stand-pipes disposed in a substantially vertical position, a spray head carried by the upper end of each stand-pipe and adapted to be located at the surface of the earth, said spray head including a spray opening for discharging water upwardly, means providing a water tight connection between the lower end of each stand-pipe and said flexible conduit at intervals along said flexible conduit, said last named means including a portion inside of said conduit and a portion extending outside of said conduit, said last named portion having means cooperating with the adjacent portion of said stand-pipe for rotation with respect to said flexible conduit and means selectively locking said stand-pipe against such relative rotation.

27. For use in a sprinkler system, a spray head comprising a tube, an inwardly directed flange at the upper end of the tube defining an opening smaller than the bore of the tube, a recess in the inner surface of said flange concentric with said opening, said tube having a female thread at its upper end below said flange, and a plug with a male thread meshing with the female thread to permit axial adjustment of said plug, said plug having a dome shaped boss on its upper face, said plug further being provided with inclined grooves running along its side from the top to the bottom thereof said recess cooperating with said dome shaped boss to produce a controlled spray depending on the adjusted axial position of said plug.

28. A sprinkler system comprising a flexible non-metallic conduit of substantially rectangular cross section adapted to be buried in the earth, a clamping bracket including a saddle engaging three sides of said conduit, a base plate secured to said bracket and engaging the fourth side of said conduit to prevent relative rotation between said bracket and said conduit and a stand-pipe extending through a portion of said saddle in engagement therewith, said stand-pipe having a fluid tight connection with a wall of said conduit, said fluid tight connection including means independent of said bracket for clamping a wall of said conduit.

References Cited in the file of this patent

UNITED STATES PATENTS

| | | |
|---|---|---|
| 315,652 | Moss | Apr. 14, 1825 |
| 1,151,089 | Dietsch | Aug. 24, 1915 |
| 1,741,557 | Coles | Dec. 31, 1929 |
| 2,083,282 | Thompson | June 8, 1937 |
| 2,229,998 | Corner | Jan. 28, 1941 |
| 2,257,427 | Parker | Sept. 30, 1941 |
| 2,271,465 | Robinson | Jan. 27, 1942 |
| 2,525,399 | Collison | Oct. 10, 1950 |
| 2,555,303 | Collins | June 5, 1951 |
| 2,622,279 | Williams | Dec. 23, 1952 |
| 2,706,134 | Wilson | Apr. 12, 1955 |

FOREIGN PATENTS

| | | |
|---|---|---|
| 15,759 | Great Britain | of 1909 |